US00RE35166E

United States Patent [19]

Chapple

[11] E Patent Number: Re. 35,166

[45] Reissued Date of Patent: Mar. 5, 1996

[54] CATALYST

[75] Inventor: Paul Chapple, Clwyd, Wales

[73] Assignee: Unilever Patent Holdings B.V., Rotterdam, Netherlands

[21] Appl. No.: 240,156

[22] Filed: May 10, 1994

Related U.S. Patent Documents

Reissue of:

[64] Patent No.: 5,021,145
Issued: Jun. 4, 1991
Appl. No.: 533,443
Filed: Jun. 5, 1990

U.S. Applications:

[62] Division of Ser. No. 328,715, Mar. 27, 1989, Pat. No. 4,948,769, which is a continuation of Ser. No. 153, 482, Feb. 2, 1988, abandoned, which is a continuation of Ser. No. 870,545, Jun. 4, 1986, abandoned.

[30] Foreign Application Priority Data

Jun. 5, 1985 [GB] United Kingdom ..... 8514209

[51] Int. Cl.[6] ..... C10G 11/04

[52] U.S. Cl. ..... 208/120; 208/52 CT; 208/121; 208/149; 502/521

[58] Field of Search ..... 208/113, 118, 208/119, 120, 121, 149, 52 CT; 502/521

[56] References Cited

U.S. PATENT DOCUMENTS

| | | | |
|---|---|---|---|
| 2,866,513 | 5/1959 | Baker | 208/121 |
| 3,985,641 | 10/1976 | Finch et al. | 208/121 |
| 4,179,409 | 12/1979 | Gladrow et al. | 208/120 |
| 4,520,120 | 5/1985 | Mitchell et al. | 502/525 |
| 4,770,765 | 9/1988 | Bartek et al. | 208/121 |
| 4,810,358 | 3/1988 | Groenenboom | 208/121 |
| 4,944,864 | 7/1990 | Kugler | 208/52 CT |

*Primary Examiner*—David Brunsman
*Attorney, Agent, or Firm*—Cushman Darby & Cushman

[57] ABSTRACT

The invention provides a catalyst composition useful in treating hydrocarbons contaminated with vanadium residues, the catalyst comprising a zeolite, a matrix and certain heavier alkaline earth metal oxides.

1 Claim, No Drawings

CATALYST

Matter enclosed in heavy brackets [ ] appears in the original patent but forms no part of this reissue specification; matter printed in italics indicates the additions made by reissue.

This is *a reissue of U.S. Pat. No. 5,021,145, application 07/533,443, filed Jun. 5, 1990, which is* a division of application Ser. No. 07/328,715, filed Mar. 27, 1989, now U.S. Pat. No. 4,948,769 which is a continuation of Ser. No. 07/153,482, filed 2/2/88, abandoned, which is a continuation of Ser. No. 06/870,545, filed 6/4/86, abandoned.

FIELD OF THE INVENTION

The invention relates to cracking catalysts and to catalytic cracking, which is a major refinery process for the conversion of hydrocarbons to lower boiling fractions. More specifically, the invention relates to catalyst compositions which are particularly resistant to degradation by vanadium deposited on the catalyst in the course of the cracking reaction, and to an improved process for cracking vanadium containing feedstocks by using these catalysts.

BACKGROUND TO THE INVENTION

Catalysts containing crystalline zeolites dispersed in an inorganic oxide matrix have been used for the catalytic cracking of petroleum-derived feedstocks for many years. During this time, it has been widely recognised in the industry that certain contaminants (notably vanadium, nickel, and iron), initially dissolved or dispersed in the hydrocarbon feedstock, are deposited on the catalyst during the catalytic cracking process, and the accumulated deposits lead to undesirable changes in the activity and selectivity of the thus contaminated catalysts. Typically, the harmful effects noted have been increased yields of coke and hydrogen, a phenomenon ascribed to the action of the deposited metals as centres of dehydrogenation. More recently, however, it has been appreciated that vanadium also has other harmful properties, as well as increasing dehydrogenation activity, it reacts with and destroys the zeolite component of the catalyst, leading to a severe decrease in the activity of the catalyst.

These problems have become more acute as refiners have faced the need to process heavier feedstocks which contain increased amounts of the metal contaminants, and various strategies have been employed to alleviate the deleterious effects and facilitate smooth running of catalytic cracking units. These approaches have included.

(1) more frequent replenishment of the circulating catalyst inventory;

(2) withdrawal of the regenerated catalyst and treatment with various chemicals to passivate the metals;

(3) changes in the design or operation of the catalytic cracker to reduce the poisoning activity of the contaminant metals;

(4) addition to the feedstock of compounds of elements such as antimony, tin, barium, manganese, germanium and bismuth.

Examples of these approaches will be found in the following patents: U.S. Pat. Nos. 4,111,845, 4,101,417, 4,377,494, 4,367,136, 3,977,963.

Further attempts to cope with harmful effects of metals, especially vanadium, have related to modifications of the cracking catalyst itself; these have included admixture with sacrificial catalyst particles, careful control of the zeolite composition, and inclusion in the catalyst of specified amounts of vanadium trapping additives, including alumina, titanium dioxide (titania) and zirconium dioxide (zirconia) and certain compounds of calcium and magnesium. Disclosures of such catalysts will be found in U.S. Pat. Nos. 4,432,890, 4,451,355 and BE 899,446.

GENERAL DESCRIPTION OF THE INVENTION

The present invention provides a catalyst composition comprising a i) crystalline zeolite, ii) a matrix material, and iii) certain crystalline mixed oxides, derived from the heavier alkaline earth elements (calcium, strontium, barium) and certain combinations with elements of group IV of the periodic table, which oxides have themselves no harmful effects on the catalytic properties but are present in amounts sufficient to act as a vanadium passivator.

Accordingly, the present invention provides a catalyst composition comprising i) a crystalline zeolite, ii) a matrix material and iii) a mixed oxide selected from calcium, strontium and barium tin oxides and strontium and barium titanium oxides and mixtures thereof.

The crystalline zeolite component of the present invention, which is usually present in the range from about 5% to about 40% by weight, may generally be described as a crystalline, three dimensional, stable structure enclosing cavities of molecular dimensions. Most zeolites are based on aluminosilicate frameworks, the aluminium and silicon atoms being tetrahedrally coordinated by oxygen atoms. However, for the purposes of our invention we include as "zeolites" similar materials in which atoms of other elements are present in the framework, such as boron, gallium, germanium, chromium, iron, and phosphorus. Further we include materials such as pillared interlayered clays ("PILCS"), which have many of the catalytically valuable characteristics of the aluminosilicate zeolites. We also include all modifications to the above materials, whether obtained by ion-exchange, impregnation, hydrothermal or chemical treatments.

Zeolites which can be employed in the catalysts and processes of this invention can be natural or synthetic in origin. These naturally occurring zeolites include gmelinite, chabazite, dachiardite, clinoptilolite, faujasite, heulandite, analcite, levynite, erionite, sodalite, canorinite, mepheline, lazurite, scolecite, natiolite, offretite, mesolite, mordenite, brewsterite, fevierite, and the like. Suitable synthetic zeolites are zeolites A,B,E,F,H,J,L,Q,T,W,Z,Y,Z, alpha, beta, omega, the EU types, the Fu types, the Nu types, the 2K types, the ZSM types, the ALPO types, the SAPO types, the L2 series, and other similar materials will be obvious. The effective pore size of the synthetic zeolites are preferably between 0.6 and 1.5 nanometers, and the prefered zeolites are those with the faujasite framework and silica/alumina ratios >3, thus including synthetic zeolite Y and the various form of Y which have been made more siliceous by chemical, hydrothermal or thermal treatments.

In a preferred embodiment of the invention, the zeolite is converted to a form which is most applicable for catalytic cracking. In general this involves a sequence of ion-exchange and calcination treatments to introduce acid groups into the zeolite, stabilise the structure, and remove alkali metal cations. The prefered method of achieving this end, well known in the art, is to exchange the zeolite with solutions containing ammonium ions and/or rare earth ions (either a pure rare earth compound or a mixture).

Such treatment can be carried out either on the zeolite before it is incorporated in the catalyst, or on the finished catalyst containing the zeolite, it can be carried out on a filter press, filter table, or filter belt, or by slurrying the zeolite/catalyst in a tank.

The matrix into which the zeolite is incorporated can have a wide range of compositions. Suitable components include: naturally occurring or synthetic clays, including kaolin, halloysite and montmorillonite; inorganic oxide gels, including binary gels such as silica, silica-alumina, silica-zirconia, silica-magnesia, aluminium phosphates, or ternary combinations such as silica-magnesia-alumina; and crystalline inorganic oxides such as silica, alumina, titania, zirconia.

Suitable mixed oxides for use as component (iii) are:

$CaSnO_3$
$Ca_2SnO_4$
$SrTiO_3$
$SrTi_{12}O_{19}$
$Sr_2TiO_4$
$Sr_3Ti_2O_7$
$Sr_4Ti_3O_{10}$
$SrSnO_3$
$SR_2SnO_4$
$Sr_3S_2O_7$
$BaTiO_3$
$BaTi_2O_5$
$BaTi_4O_9$
$BaTi_5O_{11}$
$Ba_2TiO_4$
$Ba_2Ti_5O_{12}$
$Ba_2Ti_9O_{20}$
$Ba_4Ti_{13}O_{30}$
$Ba_6Ti_{17}O_{40}$
$BaSnO_3$
$Ba_2SnO_4$

The mixed oxide additive is a discrete component of the final catalyst, and is readily identifiable in the fresh catalyst by x-ray diffraction analysis. These materials are insoluble, and are not decomposed into their component oxides over a wide range of thermal and hydrothermal treatments, and, as such are readily identifiable in hydrothermally deactivated catalyst samples. Preferably the mixed oxide is present at a level of least about 1% by weight of the catalyst and up to about 20% by weight.

The chemical form of the additive is central to determining the concentration in which it is used in the catalyst composition, or indeed its method of incorporation into the catalyst formulation.

It is a possibility that the alkaline earth mixed oxide additive reacts with vanadium on the catalyst through a displacement type reaction resulting in the formation of high melting point alkaline earth vanadates, thus immobilising the vanadium, and preventing its further reaction with, and destruction of the zeolite component of the catalyst, but there might also be another explanation. In this manner, the alkaline earth compound is involved in a competitive reaction for the vanadium with the zeolite. The alkaline earth compounds of this invention are successful as passivators as a result of their high reactivity towards vanadium compared to the zeolite.

The use of crystalline mixed oxides containing titanium or tin, is to render the alkaline earth additive inert to catalyst processing procedures, and yet active in vanadium passivation on the final catalyst, thus producing catalysts of increased vanadium tolerance, with little or no adverse changes in catalytic and physical properties, when compared to conventional catalysts.

Preferably, the concentration of the additive in the catalyst will be in at least 1:1 molar proportion of alkaline earth to vanadium with respect to the maximum vanadium level deposited on the catalyst during use. Thus, the concentration of the alkaline earth additive in the catalyst, can be tailored to best suit the process in which it is used, thereby allowing the operation of the catalytic cracking unit to be optimised.

The additives of this invention can be prepared by various processes; for example, by calcination of intimate mixtures of the oxides or carbonates of the component elements, in the appropriate molar quantities, as disclosed by J Arjomand, J Less Common Met 61 133 1978, or by coprecipitation, or metathesis of salts of the appropriate elements.

Conventional catalyst processing procedures encompass a wide range of pH conditions, typically pH 3 to pH 10, and require that any additives be resistant to such environments without themselves being decomposed, or resulting in changes in the properties of other catalyst components. The effect of additives not resistant to such environments can be to render the catalyst processing procedure inoperable, or to adversely affect both the physical and catalytic properties of the finished catalyst.

As the form of the additives of the present invention are insoluble and inert to any catalyst processing procedures, the catalysts containing these additives may be prepared by any of the conventional methods used for the manufacture of FCC catalysts. For example, catalyst may be prepared by making an inorganic oxide sol at pH 3 and adding to this, aqueous slurries of the other catalyst components including zeolite and alkaline earth additive. The homogenised slurry can then be spray dried to produce catalyst microspheres, and washed free of soluble salts using for example aqueous ammonium sulphate and water.

The catalyst compositions of this invention are employed in the cracking of vanadium containing heavy hydrocarbon feedstocks, to produce gasoline, and light distillate fraction. Typical feedstocks would have an average boiling point greater than 316° C., and include such materials as gas oils, and residual oils.

Because the catalysts of this invention are effective in cracking processes even when contaminated with vanadium to levels in excess of 5000 ppm, these catalysts can be used to process feedstocks containing significantly higher concentrations of vanadium than those employed in conventional catalytic cracking operations.

These catalysts may be employed in any catalytic cracking process capable of operating with conventional microsphere fluid catalysts.

SPECIFIC DESCRIPTION OF THE INVENTION

The following examples illustrate the advantages of the invention. However, it is not intended that the invention be limited to the specific examples given.

EXAMPLE 1

A calcium stannate additive was prepared by mixing together, with constant agitation, a solution of 236 g of $Ca(NO_3)_2.4H_2O$, in 500 g of deionised water, and a solution of 267 g $Na_2SnO_3.3H_2O$ in 500 g of deionised water. The resulting precipitate was filtered, and washed repeatedly, until the filtrate was free of $Na^+$. The filter cake was then dried at 100° C., and finally calcined at 1000° C. for 4 hrs, to give crystalline $CaSnO_3$ which was identified by X-ray diffraction. The crystalline $CaSnO_3$ was finally finely ground prior to incorporation into the catalyst.

The catalyst composition was prepared by combining together 75 g $Al_2O_3$, 276 g kaolin, 138 g $CaSnO_3$, and 165 g CREY (Calcined Rare Earth Y zeolite), in 2175 g of a silica sol (8% $SiO_2$) at pH 3.2 to provide a homogeneous slurry. The slurry was then spray dried to form catalyst microspheres with an average particle size of 60 microns.

The spray-dried catalyst was then washed with deionised water, ca 0.25M ammonium sulphate, and finally deionised water to remove sodium, until the conductivity of the filtrate fell below 1 milli mho.

EXAMPLE 2

The strontium titanate additive was prepared by grinding together 104 g of $SrCO_3$, and 80 g of $TiO_2$ to give a homogeneous mixture. The mixture was then calcined at 1000° C. for 20 hrs to give crystalline $SrTiO_3$ which was identified by X-ray diffraction. The crystalline $SrTiO_3$ was finally finely ground prior to incorporation into the catalyst.

The catalyst composition was prepared by combining together 100 g $Al_2O_3$, 478 g kaolin, 89 g $SrTiO_3$, and 219 g CREY in 2871 g of a silica sol (8% $SiO_2$) at pH 3.2 to provide a homogeneous slurry.

The slurry was then spray dried into microspheres of catalyst, and the catalyst finally washed according to the procedure in the previous example to remove soluble $Na^+$ ions.

EXAMPLE 3

The barium titanate additive was prepared by grinding together 197 g of $BaTiO_3$, and 79.9 g of $TiO_2$ to give a homogeneous mixture. The mixture was then calcined at 1000° C. for 16 hrs to give crystalline $BaTiO_3$, which was identified by X-ray diffraction.

The catalyst composition was prepared by combining together 100 g $Al_2O_3$, 494 g kaolin, 76 g $BaTiO_3$, and 219 g CREY in 2850 g of a silica sol (8% $SiO_2$) at a pH of 3.2 to provide a homogeneous slurry.

The slurry was then spray dried into microspheres of catalyst, and the catalyst finally washed according to the procedure in example 1, to remove soluble $Na^+$ ions.

EXAMPLE 4

Comparative

A catalyst composition containing no alkaline earth mixed oxide additive was prepared by combining together 200 g $Al_2O_3$, 1164 g kaolin, and 438 g CREY, in 5966 g of a silica sol (8% $SiO_2$) at pH 3.2 to provide a homogeneous slurry. The slurry was then spray dried into microspheres, and finally washed according to the procedure in example 1 to remove soluble $Na^+$ ions.

EXAMPLE 5

A sample of catalyst of example 1. previously thermally treated to 538° C. for 2 hrs was impregnated with 5000 ppm vanadium according to the following procedure. 50 g of the dried catalyst was slurried in 50 ml of an aqueous solution containing 1.24 g $VOSO_4$ in a rotary evaporator. The slurry was allowed to fully mix for 30 mins at room temperature with constant agitation. The slurry was then dried under vacuum to yield the vanadium impregnated catalyst. The impregnated catalyst was finally calcined at 538° C. for 2 hrs (Catalyst IM).

EXAMPLE 6

50 g of catalyst of Example 2, thermally treated to 538° C. for 2 hrs was impregnated with 5000 ppm V using the procedure detailed in example 5 (Catalyst IIM).

EXAMPLE 7

50 g of catalyst of Example 3, thermally treated to 538° C. for 2 hrs, was impregnated with 5000 ppm V, using the procedure detailed in example 5 (Catalyst IIIM).

EXAMPLE 8

50 g of catalyst of Example 4, thermally treated to 538° C. for 2 hrs, was impregnated with 5000 ppm V, using the procedure detailed in example 5 (Catalyst IVM).

The catalysts from the above examples were evaluated in a microactivity test (MAT) unit. Prior to testing, the catalyst samples were thermally treated at 538° C. for 3 hrs and then deactivated in steam, at atmospheric pressure, at a temperature of 788° C. (1450° F.) for a period of 4 hrs. The cracking conditions used for the MAT were 482° C. (900° F.), a space velocity of 16.0 WHSV and a catalyst to oil ratio of 3. The gas oil feed used in all of the tests was characterised as follows:

| | |
|---|---|
| Gravity °API | 27.6 |
| Sulphur wt % | 0.64 |
| Nitrogen wt % | 0.09 |
| Carbon residue wt % | 0.39 |
| Aniline point °F. | 182.00 |
| Distillation °F. | |
| 10% at 760 mm Hg | 574 |
| 30% at 760 mm Hg | 682 |
| 50% at 760 mm Hg | 773 |
| 70% at 760 mm Hg | 870 |
| 90% at 760 mm Hg | 991 |
| Initial Boiling Point | 338 |
| Final Boiling Point | 1061 |

TABLE 1

| | Catalyst No | | | |
|---|---|---|---|---|
| Wt % | I | II | III | IV |
| Conversion | 75.5 | 76.3 | 76.2 | 75.3 |
| Gasoline | 56.9 | 58.2 | 57.8 | 57.5 |
| LCO | 15.2 | 14.7 | 14.4 | 15.7 |
| $H_2$ | 0.08 | 0.033 | 0.046 | 0.019 |
| Coke | 4.78 | 4.21 | 4.14 | 3.78 |

TABLE 2

| | Catalyst No | | | |
|---|---|---|---|---|
| Wt % | IM | IIM | IIIM | IVM |
| Conversion | 53.2 | 44.9 | 31.8 | 19.0 |
| Gasoline | 43.1 | 36.3 | 25.1 | 12.9 |
| LCO | 19.4 | 23.1 | 24.3 | 23.1 |
| $H_2$ | 0.11 | 0.19 | 0.22 | 0.31 |
| Coke | 2.83 | 2.58 | 2.17 | 3.14 |

line yield are effectively unaltered by the addition of the additives, while coke and $H_2$ yields are slightly increased.

The performance of catalysts containing the alkaline earth additives of this invention, in the presence of vanadium show considerable benefits over catalysts containing no such additives, as can be seen by comparison of the results for catalysts (IM-IIIM) with catalyst (IVM) (Table 2) all in the presence of 5000 ppm Vanadium. These results show substantial improvements in vanadium tolerance for the catalyst compositions containing the additives as seen by higher conversion levels, improved gasoline selectivity, and reduced coke and hydrogen production.

I claim:

1. A method of cracking vanadium containing hydrocarbon feedstocks wherein the feedstock is contacted with a catalyst composition comprising:

(i) a crystalline zeolite, (ii) a matrix material, and (iii) a single phase crystalline mixed oxide selected from calcium and barium tin oxides, the strontium tin oxides $Sr_2SnO_4$ and $Sr_3Sn_2O_7$, strontium titanium oxides and [the barium titanium oxides $BaTi_2O_5$, $BaTi_4O_9$, $BaTi_5O_{11}$, $Ba_2TiO_4$, $Ba_2Ti_5O_{12}$, $Ba_2Ti_9O_{20}$, $Ba_4Ti_{13}O_{30}$, and $Ba_6Ti_{17}O_{40}$, and] mixtures thereof.

* * * * *